Nov. 9, 1943.  H. D. MINICH  2,334,022
RUBBER HYDROHALIDE FILM
Filed Aug. 3, 1940
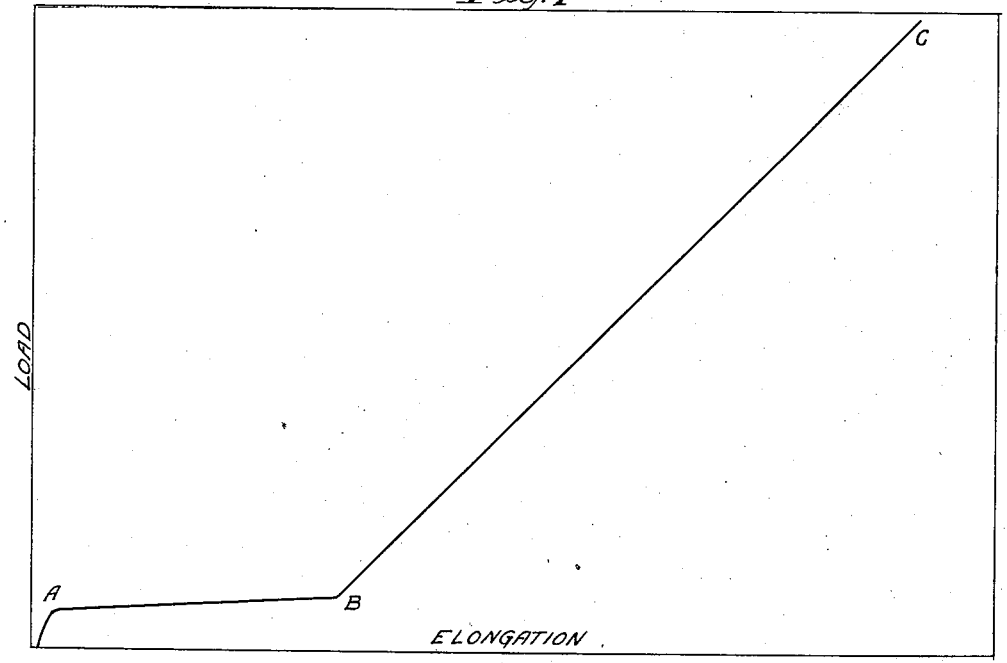
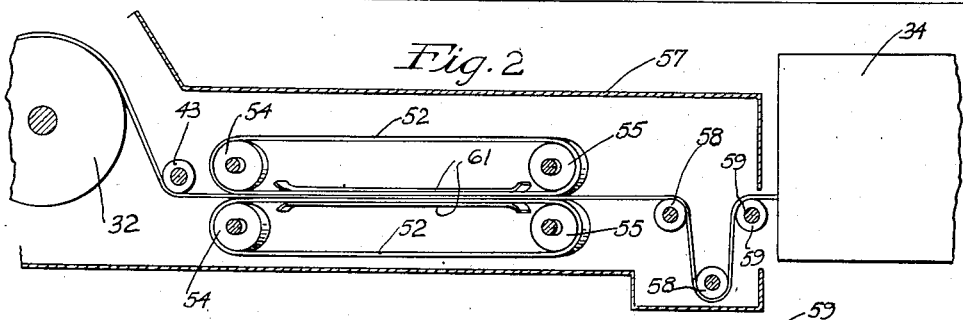
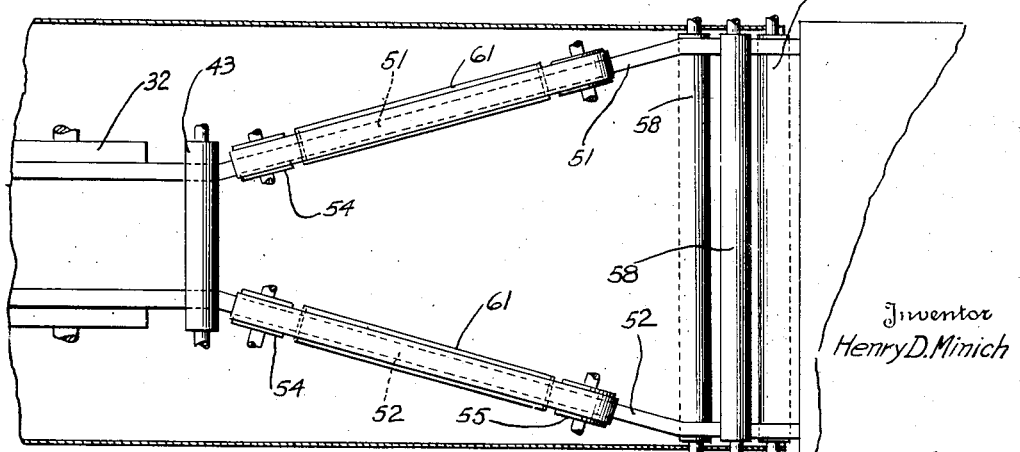
Inventor
Henry D. Minich
By H. H. Watro
Attorney Patented Nov. 9, 1943

2,334,022

UNITED STATES PATENT OFFICE 2,334,022

RUBBER HYDROHALIDE FILM

Henry D. Minich, Tarrytown, N. Y.

Application August 3, 1940, Serial No. 350,626
In Canada April 22, 1937

1 Claim. (Cl. 18—57)

This invention relates to stretching a rubber hydrohalide, such as rubber hydrochloride. More particularly it relates to the continuous lateral stretching of a long sheet of the material. The sheet may be a narrow ribbon or a wider sheet. Although the invention will be described more particularly as applied to the stretching of rubber hydrochloride, it includes the stretching of other rubber hydrohalides, such as rubber hydrobromide, etc.

This application is a continuation of my application, Serial No. 143,503, filed May 19, 1937. That application relates to the continuous lateral stretching of a sheet of rubber hydrochloride, etc., and the rubber hydrochloride sheet may be stretched longitudinally as well as laterally. In order to stretch longitudinally, the sheet is passed over a heated roll, which we will refer to as the first roll, which has a given surface speed, and then it is passed over a second roll with a much higher surface speed. The second roll may, for example, have a surface speed three or six or more times that of the first roll. As the film leaves the first roll, it is heated to a temperature at which it is readily stretchable. Since the second roll travels at a higher surface speed than the surface speed of the first roll, the film is stretched in passing from the first roll to the second roll. The stretching occurs in the portion of the film which is most easily stretched. This lies in the zone immediately adjacent the first roll on which the film is heated. The portion of film which is heated to the highest temperature, that is, the film which has just parted contact with the heated roll is continually changed as the film passes from the one roll to the other. Although the portion of film which is heated to the highest temperature, and therefore is most readily stretchable, is continually changing, this film will be found in the zone immediately adjacent the first roll. The stretching is therefore localized in this zone, and the film which is stretched is continually changing. Since all of the film passes through this zone, and in passing through the zone constitutes the film which is most readily stretched and is, as a consequence, subjected to the same amount of stretching, the entire film after passing through this zone has received a uniform stretch.

Although the film is stretched uniformly along its longitudinal axis when so heated and stretched, it has been found that the lateral stretching of a rubber hydrohalide film is not uniform unless the film has been stretched to an amount at least equal to a given minimum. This minimum varies. In explaining this irregular stretching, reference will be had to the accompanying drawing. In the drawing Fig. 1 is the stress-strain curve typical of rubber hydrochloride film. Fig. 2 shows diagrammatically, apparatus used for stretching and Fig. 3 is a plan view of the apparatus shown in Fig. 2.

Referring now to Fig. 1, it is noted that the load applied in stretching is computed along the ordinate and the elongation is computed along the abscissa. Up to a certain point an increase in the load is required to elongate the film. After this point has been reached (the point A of the graph) no increase in load is required in order to produce elongation. Then a point is reached (point B of the graph) when no elongation is obtained without an increase in the load. From this point the curve slants up to the right and the section from this point up is known as the curve B—C. This curve is typical of rubber hydrochloride. The A point and B point vary from batch to batch. The use of plasticizers generally shortens the portion A—B of the curve, but in general, the shape of the curve is unchanged, except that when a considerable amount of plasticizer is added, the portion A—B of the curve may disappear. Heating, of course, reduces the load required, although it does not materially change the shape of the curve. The B point varies considerably from one rubber hydrochloride sheet to the next, and may be as low as around 100 to 150% or up as high as 500 or 600%, the first figure representing a film with two to two and one-half times the area of an unstretched film and the latter figure representing a film with an area six or seven times that of the original film.

It is readily understood that as the film is heated and stretched, the portion A—B of the film is reduced and if the film is stretched sufficiently, the portion A—B of the film disappears entirely. Since when the film is stretched longitudinally by passing between two rolls, the first of which is heated and the second of which travels at a higher surface speed than the surface speed of the first, the zone of film which is most readily stretchable is that adjacent the first roll, and this zone is constantly changing, the film is stretched uniformly in a longitudinal direction regardless of whether it is stretched an amount sufficient to eliminate the portion A—B of the curve, or not. However, in stretching the film laterally it is necessary to eliminate this portion A—B of the curve in order to obtain a film which has been stretched uniformly. This will be evident from what follows:

No means has been devised for stretching film laterally which gives a stretch equivalent to that obtained by stretching longitudinally between two rolls as above described. The lateral stretching is equivalent to gripping the heated film at the edges and pulling it. The hottest portion of the film or the thinnest portion of the film stretches most readily, and this is the portion of the film which stretches first. As the film is stretched, this portion which is most easily stretched becomes thinner and therefore stretches more easily. The thicker portion or portions and the cooler portion or portions are stretched little if at all. This condition prevails until the film has been stretched to the B point. That is until the portion A—B of the curve has been eliminated, because until the film has been stretched this much, no additional load is required to increase the elongation. Thus we see that although one may stretch rubber hydrohalide film longitudinally, even to a small amount, and obtain substantially uniform stretch throughout the entire length of the film if the stretching is done by passing the film over rolls as above described, in order to obtain uniform lateral stretch it is necessary to stretch the film until the plateau of the curve or until the A—B portion of the curve has been removed, i. e., until the film has been stretched to the point where increase in load is required to produce any further elongation. Whether stretched longitudinally or laterally the film, of course, is maintained under tension until it is cooled.

As explained in my prior application, the film is advantageously heated to a temperature above about 180° F. prior to stretching. It is preferably stretched to three or more times its original area. For example, the film of rubber hydrochloride may be brought to a temperature of about 200° F. and then subjected to the stretching or drawing treatment. The heated film is preferably drawn or extended to increase its length to three or six times its length before heating. The film is then cooled while maintained under tension.

According to a preferred method of that prior application, the film is fed over a heated surface at a speed which brings the temperature of the film to the desired raised softening temperature, and the heated film is withdrawn from the heated surface at a speed three to six times the speed with which it is fed to the heated surface causing the heated film to be drawn and extended or stretched to increase its area to a multiple of the original film area while reducing its thickness to a fraction of the original thickness. This stretching is conveniently carried out by feeding the film through a pair of suitably driven feed rolls to a heating cylinder from which the heated film is withdrawn by drawing rollers driven at a peripheral speed which is a multiple of the peripheral speed of the feeding rolls. The stretched film is cooled before entering the drawing rollers by cooling means such as a fan or a stream of air. The tearing and tensile strength of the resulting film in the direction in which it has been stretched is several times increased. It has a luster and crackly feel not present in the untreated film.

As explained in the prior application the longitudinal stretching of the film just described does not increase its tearing and tensile strength in the direction transverse to the direction in which it has been extended. It is now known that stretching in the longitudinal direction does not materially or at all effect the stress-strain curve of the film in the transverse direction. The film can be given increased tear and tensile strength in all directions by stretching the film laterally as well as longitudinally. The appearance, smoothness and other characteristics of the laterally stretched film may be controlled by regulating the approach of the film to the heating surface and by varying the character of the heating and the guiding surfaces used in the drawing or stretching process so as to produce a final thin film of special appearance.

The present invention relates to the lateral stretching of a continuous sheet or film. This film may be stretched longitudinally before or after stretching laterally, and it may be possible to stretch it longitudinally and laterally at the same time. In the accompanying drawing, Figs. 2 and 3 show means for stretching the film laterally or transversely. In these drawings the lateral stretching is followed by longitudinal stretching, although it will be understood that the longitudinal stretching is not an essential feature of the invention and may be omitted.

Referring to Figs. 2 and 3 it will be seen that two pairs of draw belts 51, 52 mounted in divergent directions on the opposite sides of the rubber hydrochloride sheet fed from the guide roller 43 are mounted on pulleys 54, 55 in divergent directions in front of the roller so as to grip the edges of the rubber hydrohalide sheet and draw it transversely to the direction of its motion. As a result, the forwardly moving sheet is gradually stretched in a direction transverse to its motion to a multiple of its original width until an increase in load is required to effect further stretching. The film may be stretched beyond this point, although it is essential that it be stretched to this extent. While stretching laterally the thickness of the film is reduced to a fraction of its original thickness. The transversely stretched rubber hydrochloride sheet is then guided over equalizing rollers 58, 59 into the cooling compartment 34 and from there it may be passed to drawing rollers which subject the transversely stretched sheet to a longitudinal stretching.

In order to maintain the rubber hydrochloride sheet in a stretchable condition, the sheet is maintained at the required temperature at each stage of its travel. Thus the heating cylinder 32 and the transverse stretching mechanism may be enclosed in a compartment 57 in which the temperature is controlled so as to maintain the various parts of the rubber hydrochloride sheet subjected to stretching at a desired elevated temperature.

As the transversely stretched sheet emerges from the compartment 57 in which it is maintained at a stretching temperature, drawing rollers may grip the forward portion of the cooled sheet which has passed through the cooling compartment 34 and draw it at a higher rate of speed than the portion drawn by the belts 52. This causes the portion which enters the cooling compartment to be stretched in a longitudinal direction.

The temperature of the sheet along the path of its travel may be regulated by suitably controlling the temperature of the rollers with which the sheet is brought in contact at the various steps of the process.

To maintain the required gripping pressure between the surfaces of the drawing belts 51 and 52 and the edges of the laterally stretched sheet, presser plates 61 are provided on the inner sides of the belts facing the edges of the sheets and arranged so as to exert suitable gripping pressure on the edges of the stretched sheet and thus secure the required stretching action.

Materials capable of prolonging the life of rubber hydrochloride compounds may be added to the sheet material, such as, for example, hexamethylene tetramine. The process of the invention makes possible the production of rubber hydrochloride sheet material of a thickness of about .0003 to .0002 of an inch and a degree of flexibility and tensile strength much higher than that found in the best rubber hydrochloride sheets available before the invention.

Depending upon the use to which it is to be put, the rubber hydrochloride sheet will be stretched in one direction only or in both directions. Thus, for instance, if a thin sheet having greater strength in one direction is required, a sheet of rubber hydrochloride of a thinness of .001 of an inch may be drawn and extended in accordance with the invention to increase its length in the direction in which it is drawn three to six times, while correspondingly increasing its area three to six times, and at the same time reducing its thickness to a fraction of its original thickness. If rubber hydrochloride sheet material having in its unstretched state a thickness of .001 of an inch is to be stretched transversely as well as longitudinally, the original area may be similarly increased to three to six times and its thickness reduced. If the final material obtained by stretching has to have a certain minimum thickness in order to maintain a certain special degree of moisture-proofness or withstand certain pressures, a correspondingly thicker starting material is subjected to the drawing process of the invention and extended by stretching to the thickness required for the particular use, the lateral stretching being carried to the point where an increase in load is required to produce further elongation in order to obtain a sheet of uniform thickness.

In order to secure satisfactory results the rubber hydrochloride sheet material should be drawn so as to extend its area to at least about three times its original area, but the properties inherent in the stretched film are manifested to a still fuller degree if the stretching process is carried on so as to increase the stretched sheet to about four to six times the original area and for certain rubber hydrochloride, such lateral stretching is required in order to stretch the film to the B point.

If stretching to the extent indicated in Fig. 3 of the drawings does not stretch the film to the point where an increase in load is required to produce greater lateral elongation, the stretching belts should be lengthened, or they should be set at a greater angle so as to produce at least the minimum amount of stretch for carrying out the present invention.

The novel features of the invention disclosed herein are equally applicable to the stretching and laminating processes and products disclosed in my copending applications as follows:

Applications Ser. No. 77,123, filed April 30, 1936, and Ser. No. 251,465, filed January 18, 1939, and the specifications and drawing of my said prior applications are hereby included as a part of the present application.

I claim:

The method of continuously laterally stretching a sheet of a rubber hydrohalide which comprises moving the sheet continually in a longitudinal direction, heating the sheet and pulling it out laterally past the elongation short of which the sheet does not pull out uniformly, thereby causing the sheet to be laterally stretched uniformly throughout its width.

HENRY D. MINICH.

CERTIFICATE OF CORRECTION.

Patent No. 2,334,022.   November 9, 1943.

HENRY D. MINICH.

It is hereby certified that error appears in the printed specification of the above numbered patent requiring correction as follows: Page 2, first column, line 70, for "feed" read --feel--; and that the said Letters Patent should be read with this correction therein that the same may conform to the record of the case in the Patent Office.

Signed and sealed this 1st day of February, A. D. 1944.

(Seal)
Henry Van Arsdale,
Acting Commissioner of Patents.